US008867410B2

(12) United States Patent
Vainikka et al.

(10) Patent No.: US 8,867,410 B2
(45) Date of Patent: Oct. 21, 2014

(54) EMBEDDED MBMS STATUS INFORMATION REPORTING OF IDLE UE IN SUPPORTING LTE MBMS AUDIENCE MEASUREMENT

(76) Inventors: Markku Juha Vainikka, Kiviniemi (FI); Vinh Van Phan, Oulu (FI)

( * ) Notice: Subject to any disclaimer, the term of this patent is extended or adjusted under 35 U.S.C. 154(b) by 988 days.

(21) Appl. No.: 12/733,351

(22) PCT Filed: Aug. 29, 2008

(86) PCT No.: PCT/EP2008/061436
§ 371 (c)(1),
(2), (4) Date: Feb. 23, 2010

(87) PCT Pub. No.: WO2009/027529
PCT Pub. Date: Mar. 5, 2009

(65) Prior Publication Data
US 2010/0202341 A1 Aug. 12, 2010

Related U.S. Application Data

(60) Provisional application No. 60/969,231, filed on Aug. 31, 2007.

(51) Int. Cl.
*H04H 20/71* (2008.01)
*H04W 76/00* (2009.01)
*H04W 76/04* (2009.01)

(52) U.S. Cl.
CPC ............ *H04W 76/002* (2013.01); *H04W 76/04* (2013.01)
USPC .......................................... 370/259; 370/312

(58) Field of Classification Search
USPC ............................ 370/312, 328, 443; 455/405
See application file for complete search history.

(56) References Cited

U.S. PATENT DOCUMENTS

| 7,349,686 | B2 | 3/2008 | Hayashi |
| 7,349,711 | B2 | 3/2008 | Hu et al. |
| 7,398,091 | B2 * | 7/2008 | Chen ............................. 455/454 |
| 7,400,593 | B2 * | 7/2008 | Choi et al. ..................... 370/310 |
| 2004/0157640 | A1 * | 8/2004 | Pirskanen et al. .......... 455/552.1 |
| 2004/0203905 | A1 * | 10/2004 | Cuffaro ........................ 455/456.1 |
| 2007/0265020 | A1 * | 11/2007 | Cuffaro ........................ 455/456.5 |
| 2008/0084871 | A1 * | 4/2008 | Wang et al. .................... 370/352 |

FOREIGN PATENT DOCUMENTS

| WO | 2004004377 A1 | 1/2004 |
| WO | 2004043025 A1 | 5/2004 |

OTHER PUBLICATIONS

3GPP TSG-RAN 2 and RAN 3 Joint MBMS Meeting R2-030076 Wokingham, England, Jan. 15-16, 2003, Jan. 13, 2003, XP050141518, 4 pages.
3GPP TSG RAN WG2#58bis R2-072819 Orlando, US, Jun. 25-29, 2007, Jun. 20, 2007, XP050135596, 1 page.

(Continued)

*Primary Examiner* — Donald Mills
*Assistant Examiner* — Henry Baron

(57) ABSTRACT

A simple and effective mechanism is shown to determine and utilize information about idle user equipment which received MBMS services for purposes of audience monitoring. The implementation can be done by defining a new information element (IE) for a proposed MBMS status information and embedding the new IE into a UE-originated message of a network control signaling procedure, e.g., RRC Connection Request which may be sent at the convenience of the UE when it transitions from the idle state to the active state for its own purposes, i.e., purposes primarily other than audience monitoring.

24 Claims, 6 Drawing Sheets

(56) References Cited

OTHER PUBLICATIONS

ETSI TS 123.246 V 6.11.1 (Dec. 2006) Technical Specification Universal Mobile Telecommunications System (UMTS); Multimedia Broadcast/Multicast Service (MBMS); Architecture and functional description (3GPP TS 23.246 version 6.11.1 Release 6), ETSI TS 123 246 ETSI Standards, Lis, Sophia Antipolis Cedex, France, vol. 3-SA2, No. V6.11.1, Dec. 1, 2006, XP014039887 ISSN: 0000-0001, 49 pgs.
Joint meeting of 3GPP TSG RAN2, RAN3, SA2 R3-070395 Feb. 12-16, 2007, St. Louis, Missouri, USA, 1 page.
3GPP TR 25.913 V7.3.0 (Mar. 2006) Technical Report 3rd Generation Partnership Project; Technical Specification Group Radio Access Network; Requirements for Evolved UTRA (E-UTRA) and Evolved UTRAN (E-UTRAN) (Release 7), 18 pages.
3GPP TR 25.813 V7.1.0 (Sep. 2006) Technical Report 3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7), 41 pages.
3GPP TSG RAN WG2 #57bis, Jan. 26-30, 2007, St. Julian's, Malta R2-071468, 4 pages.
English Abstract of CN 1499762 A, published Apr. 26, 2004, Samsung Communication Technology Research Co., Ltd., (2 pages).
English Abstract of CN 1518244 A, published Aug. 4, 2004, NEC Corp. (2 pages).
English Abstract of CN 1684469 A, published Oct. 19, 2005, Huawei Technologies Co. Ltd. (2 pages).
English translation of Chinese Office Action dated Apr. 2, 2013 in corresponding Chinese Patent Application No. 200880113450.4 filed Aug. 29, 2008 (12 pages).
Bibliographic Data for CN 1663299A, published Aug. 31, 2005, Interdigital Technology Corporation (3 pages).

\* cited by examiner

US 8,867,410 B2

EMBEDDED MBMS STATUS INFORMATION REPORTING OF IDLE UE IN SUPPORTING LTE MBMS AUDIENCE MEASUREMENT

CROSS-REFERENCE TO RELATED APPLICATION

This application claims the benefit of U.S. Provisional Application No. 60/969,231 filed Aug. 31, 2007.

BACKGROUND OF THE INVENTION

1. Technical Field

The invention relates to mobile communications and, more particularly, to better supporting communication with mobile devices relating to multimedia broadcast multicast service (MBMS).

2. Discussion of Related Art

Abbreviations
3GPP Third generation partnership program
BCCH Broadcast Control CHannel
CN Core Network
eNB eNodeB
eNodeB E-UTRAN Node B
EPC Evolved Packet Core
E- Enhanced-UTRAN
UTRAN
LTE Long Term Evolution
MCCH MBMS Control Channel
MME Mobility Management Entity
MBMS Multimedia Broadcast Multicast Service
RACH Random Access CHannel
RAN Radio Access Network
RRC Radio Resource Control
SAE System Architecture Evolution
SFN System Frame Number
UL Uplink
UMTS Universal Mobile Telecommunications System
UTRAN Universal Terrestrial Radio Access Network The following appears in numbered section 2 of the 3GPP document R3-070395 (Joint meeting of 3GPP TSG RAN2, RAN3, SA2 12-16 Feb. 2007, St. Louis, Mo., USA):

"2. LTE/SAE Working Assumption for MBMS
1) No UE Subscription verification is performed by the eNodeB or EPC for MBMS sessions/services and therefore no UE context information is required to be propagated to the eNodeB from the CN.
2) MBMS Services in LTE/SAE can be in one of two modes:
a. MBMS Broadcast mode—MBMS services sent in this mode are transmitted everywhere within the MBMS Service Area by the network irrespective of UE location or quantity. The UEs receiving MBMS in this mode do not need to leave RRC Idle for MBMS reception.
b. MBMS Enhanced Broadcast mode—MBMS services sent in this mode are not transmitted everywhere and UE location and quantity may be taken into account by the network. The UEs receiving LTE MBMS may need to leave RRC Idle state for MBMS reception.

No MBMS context is required to be established by the UE in any node above the eNodeB in LTE/SAE, for either MBMS Broadcast or MBMS Enhanced Broadcast mode."

It has been agreed in 3GPP that UE in LTE_IDLE or even RRC_IDLE state can receive MBMS services. Network awareness about UEs which are using or have used MBMS services, however, is beneficial for the system operation and performance. This has been justified in LTE requirements of MBMS counting and audience-measurement. The direct applications of the MBMS counting and audience-measurement results are to select and configure efficient MBMS transmission mode, SFN area and transmission parameters in a possibly adaptive fashion.

The need for such awareness can go deeper. For instance, it could also be motivated by the objectives described by the ARENA (Audience measurement Research Extended to New convergent media Applications and services) project (reference FP6-027124 with start date 1 Jan. 2006 and end date 31 Dec. 2006) which seeks to develop a model for covering audience measurement irrespective of the underlying delivery method or access technologies. Such a development might include identification of metrics needed such as metrics for classifying audiences and media content, identifying audience share, reach, loyalty, demographics, viewing and navigation patterns, etc.

Audience measurement for MBMS in L3G LTE has been discussed for instance in R2-071468. FIG. 2 thereof shows the eNB sending a Counting Indication message to a UE and receiving a Counting Response message in reply. However, the UE must be in RRC_Connected state to send a Counting Response. In this scenario, if UE in RRC_Idle state it has to perform an RACH procedure and complete an RRC_connection_establishment in between the receipt of the Counting Indication message from the eNB and the sending of the Counting Response from the eNB. This is rather burdensome from the UE's point of view and will moreover use up some of the air interface resources.

In 3G LTE there is a lack of simple and effective mechanisms to gain such awareness about IDLE UEs which are receiving or have just received MBMS services in which explicit counting is prevented or not required.

SUMMARY OF THE INVENTION

According to a first aspect of the present invention, a method is provided comprising determining if user equipment has used a multimedia broadcast and multicast service in an idle state, and utilizing information concerning whether said user equipment has used said multimedia broadcast and multicast service in said idle state for audience monitoring.

According to a second aspect of the present invention, apparatus is provided configured to determine if user equipment has used a multimedia broadcast and multicast service in an idle state, and to utilize information concerning whether said user equipment has used said multimedia broadcast and multicast service in said idle state for audience monitoring.

According to a third aspect of the present invention, apparatus is provided comprising means for determining if user equipment has used a multimedia broadcast and multicast service in an idle state, and means for utilizing information concerning whether said user equipment has used said multimedia broadcast and multicast service in said idle state for audience monitoring.

According to a fourth aspect of the present invention, a computer readable medium is provided having program code stored thereon for determining if user equipment has used a multimedia broadcast and multicast service in an idle state, and for utilizing information concerning whether said user equipment has used said multimedia broadcast and multicast service in said idle state for audience monitoring.

According to a fifth aspect of the present invention, a system is provided configured to determine if user equipment has used a multimedia broadcast and multicast service in an idle state, and to utilize information concerning whether said user equipment has used said multimedia broadcast and multicast service in said idle state for audience monitoring.

Various embodiments of the various aspects of the invention are described in the detailed description section below.

The present invention provides a simple and effective mechanism to gain awareness about idle UEs which are receiving or have just received MBMS services in which explicit counting is prevented or not required.

The implementation of this invention is feasible and straightforward. It can for instance be done by defining a new information element (IE) for the proposed MBMS status information and embedding the new IE into the UE-originated message(s) of proper network control signaling procedures, e.g., RRC Connection Request.

DETAILED DESCRIPTION OF EMBODIMENTS

Figure 1:
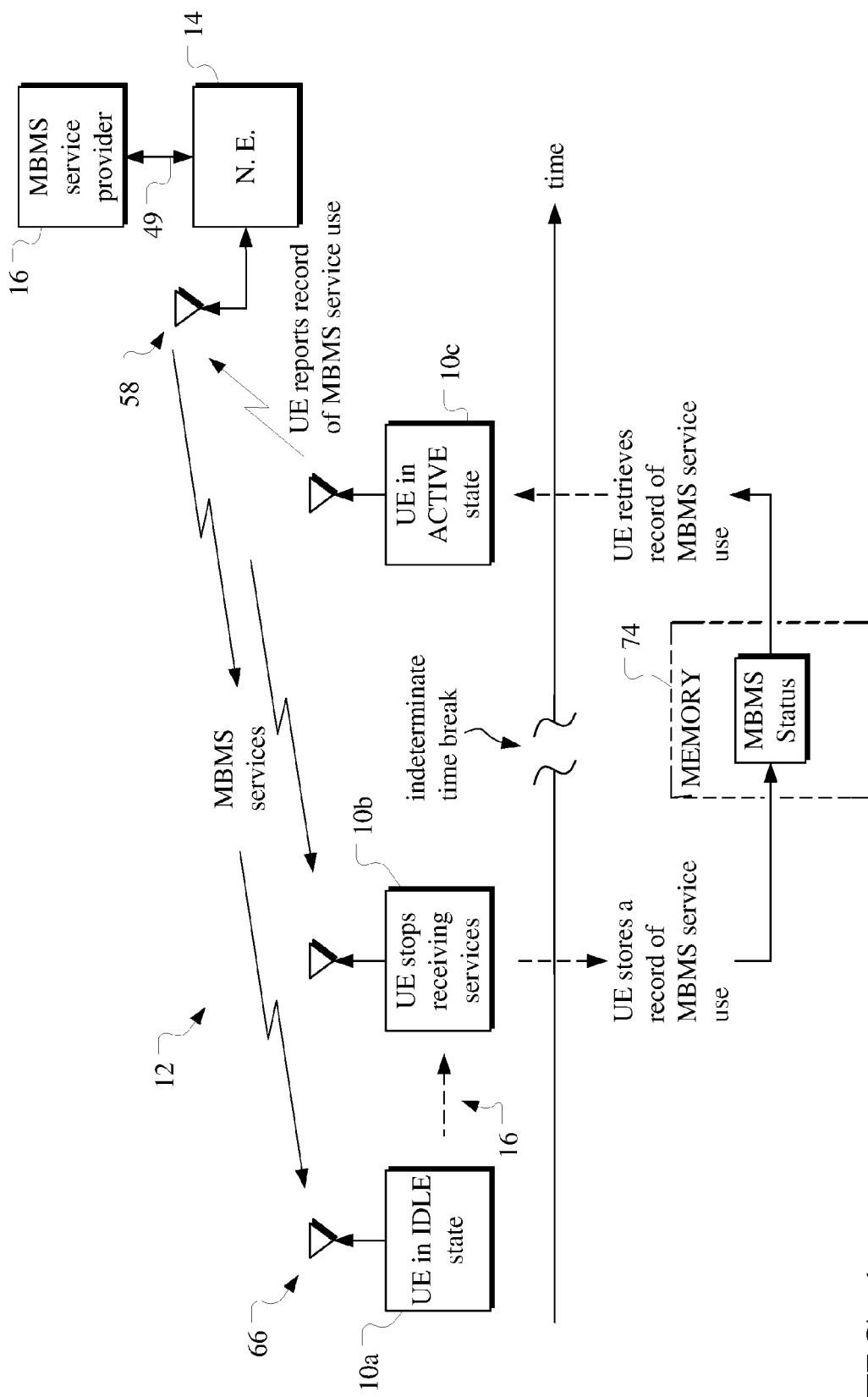
FIG. 1 shows a stylized representation of communication events in accord with the present invention.

FIG. 1 shows user equipment 10a in idle state receiving MBMS services via a wireless connection in a downlink 12 received from a network element 14. The network element 14 is connected to an MBMS service provider 16 which provides the MBMS services via the network element 14 to the user equipment 10a. As shown, after a period of time 16 has elapsed with the UE receiving the MBMS services in the idle state, the UE stops receiving the services as signified by the UE with reference numeral 10b on the time axis. It then stores a record of the MBMS services used in the memory within the UE. Although the record is shown as being stored after the service is stopped, it could be recorded earlier or later depending on circumstances and the type of information needed.

MBMS status information of the idle user equipment may include the identity of the used MBMS services and may also include further related information such as user identity, service time, location and so forth. Again, the stopping of the UE's use of the MBMS at some point in time is signified by the reference numeral 10b. Although not shown, it should be understood that the UE may remain in the idle state and again receive an MBMS service and once again make a record of the additional service use.

After a time break of indeterminate length, the UE is shown at a later time signified by reference numeral 10c having transitioned to the active state. This involves an exchange of signaling between the user equipment and the network element 14. The transition to active state shown in FIG. 1 would typically take place after an RRC Connection Request message has been sent from the user equipment 10c to the network element 14. At that time, or at a later time relating to an otherwise unrelated message sent from the user equipment to the network element, MBMS status information of the idle UE may be embedded in the message (such as but not limited to the RRC Connection Request message), assuming the network element is able to collect such information and forward it further to the MBMS service provider or other MBMS network control entities.

Thus, the idle UE, by storing the record of MBMS service usage as shown above, may later report about the use of the MBMS services to the network, e.g., at the nearest occasion when it requests to establish a radio connection for its need of communications to the network for some unrelated reason. The record may be emptied after each time of reporting. An idle UE which has an empty MBMS status information does not need to report. Other examples of MBMS status information might include reporting the information by embedding it in the UE signaling message used for the tracking-error of an update procedure, assuming the MME is able to collect such information and forward it further to the proper MBMS network control entities.

Figure 2:
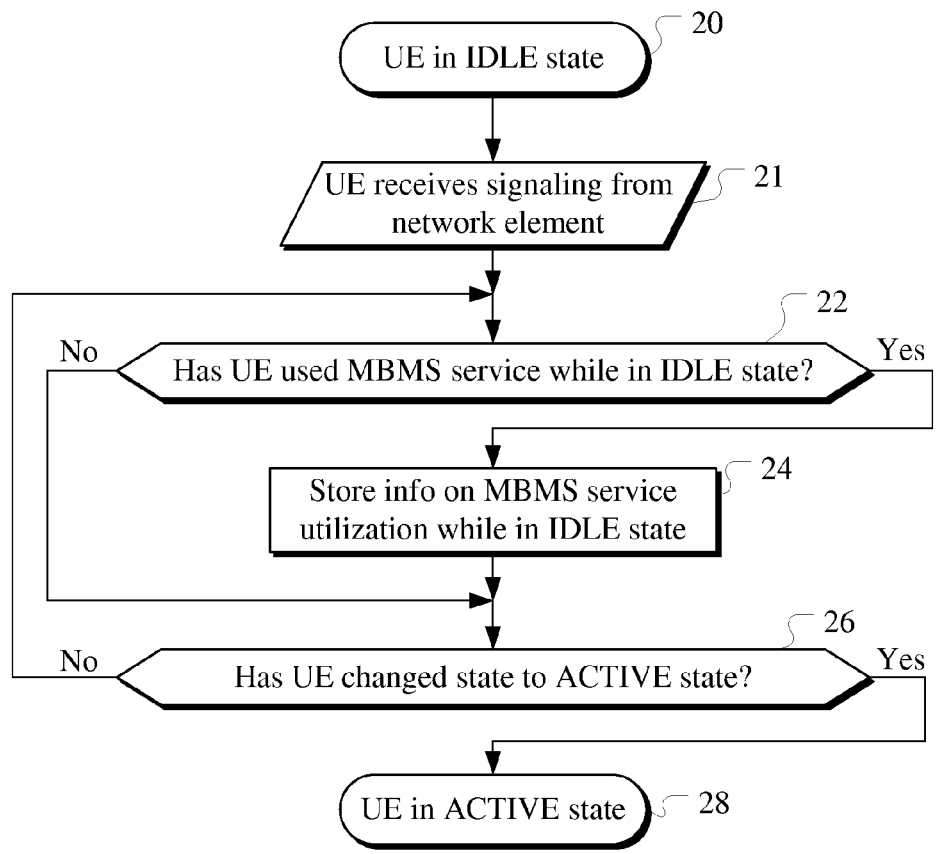
FIG. 2 is a flowchart showing a process carried out in user equipment in idle state according to the invention.

Referring now to FIG. 2, a flow chart is shown in simplified form illustrating exemplary activities of the user equipment in the idle state pertaining to the similar activity as shown on FIG. 1. The fact that the user equipment is in the idle state is signified by reference numeral 20. According to the invention, in this idle state the UE may receive signaling from the network element 14 for controlling MBMS audience measurement. Existing signaling may be adapted to carry out this function. For instance, an IDLE UE already has to receive BCCH (broadcast system information) anyway and also has to monitor MBMS-specific control channel (MCCH) for receiving any MBMS service of interest. Thus, such the common signaling can be introduced in order to:

Turn on/off the audience-measurement reporting of one or more IDLE UEs, as invented herein, in a certain service area;

Provide rules how the reporting should be, e.g., any constraints or restrictions of data format as well as specifying a reporting mechanism.

After step 21, a decision step 22 is shown for determining if the user equipment has used MBMS services while in the idle state. Such could be done at the point of time signified by the UE at time 10b in FIG. 1. This step corresponds simply to determining if the user equipment has used a multimedia broadcast and multicast service in the idle state.

The next step 24 involves utilizing the information concerning whether the user equipment has used the MBMS service in the idle state, for instance for the purposes of audience monitoring. This particular utilization step by the UE in idle state may include storing the information on the MBMS service utilization in an MBMS status register while in idle state in the UE memory shown in FIG. 1. Such a memory may comprise the random access memory shown in FIG. 9 to be described in more detail later.

A next step 26 determines whether the user equipment has changed state to the active state or not such as shown by the UE at time 10b in FIG. 1. If yes, a RRC_IDLE-to-RRC_CONNECTED transition of the user equipment will happen or will already have happened. If not, a return is made to execute steps 22 and 24 again. Referring back to step 22, if it is determined in that step that the UE has not used MBMS services while in the idle state, step 24 is skipped and step 26 is executed directly to determine if the user equipment has changed state from idle to active state. If it is determined in step 22 that the UE continues to use the same MBMS service as before, the stored information may be altered concerning the duration of usage. If a new MBMS service is determined as being used, another corresponding record for that other service may be created. In the scenario described, the audience monitoring information may be sent to the network element at the convenience of the UE when it transitions from the idle state to the active state for its own purposes, i.e., purposes primarily other than audience monitoring. Such might be for instance the establishment of a voice call.

Figure 3:
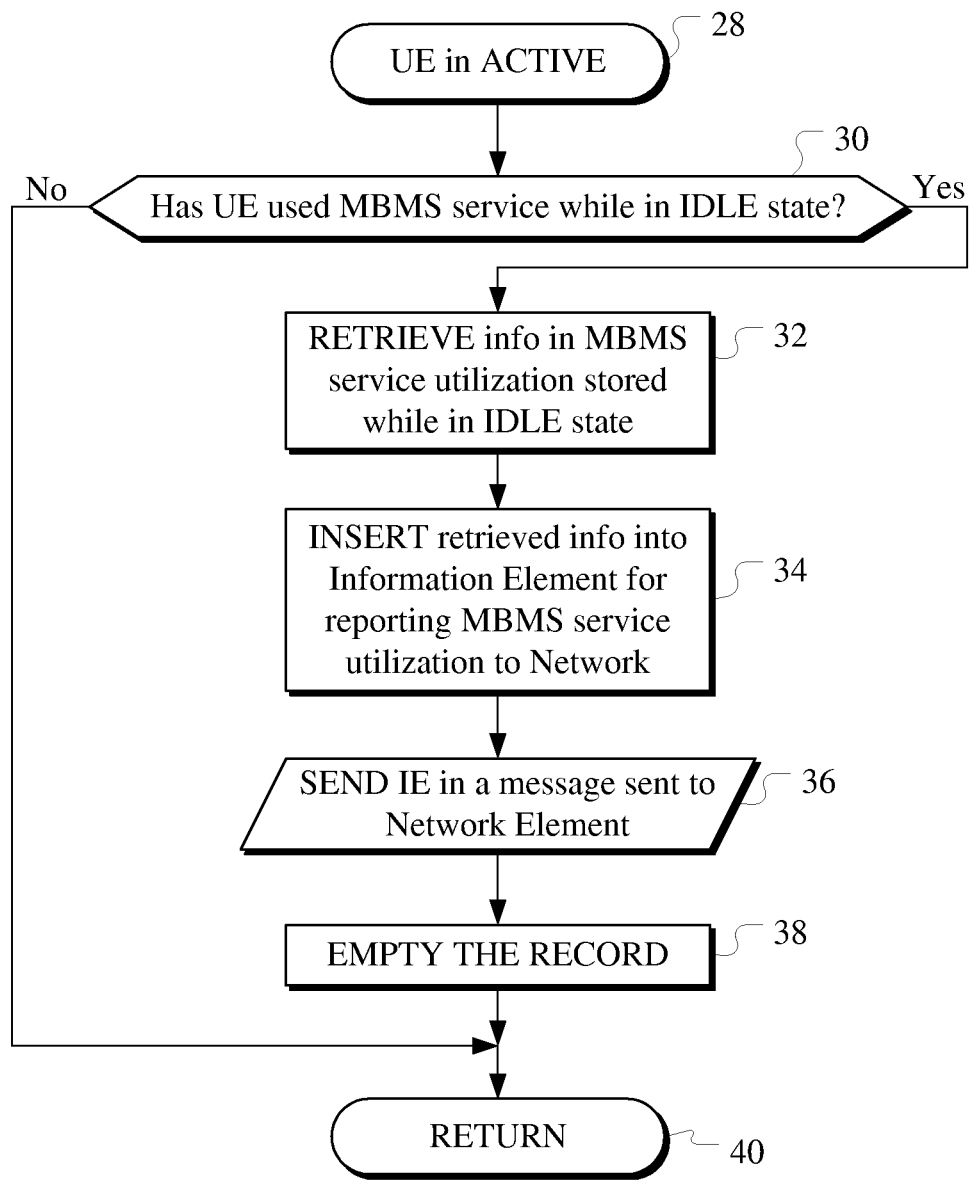
FIG. 3 is a flowchart showing a process carried out in user equipment in active state according to the invention.

If it is determined in step 26 that the UE has changed state to active state, then the steps of FIG. 3 are executed in the user equipment. This transition is signified by reference numeral 28 in both FIGS. 2 and 3. Referring back to the above-mentioned step 21 in which the network element may already have broadcast a message to the cell in which the UE presently resides, it could be mentioned that the received signaling message sent by the network element 14 may indicate that the embedded reporting of the present invention is allowed or not, e.g., in a certain area such as a cell, a group of cells, or a mobile tracking area by means of an information element of the broadcast system information sent on a Broadcast Control Channel (BCCH) or an MBMS-specific control information sent on an MBMS Control Channel (MCCH).

Referring now to FIG. 3, a simplified flow chart is shown of activities carried out in the user equipment in the active state as it pertains to the present invention as illustrated on the time line of FIG. 1 by the UE of reference numeral 10c. In a step 30, it is determined if the user equipment has used a MBMS service in the idle state. If so, the information concerning whether the user equipment has used the multimedia broadcast and multicast service in the idle state is utilized for example for audience monitoring as exemplified in the steps 32, 34, 36 as explained below. First, a step 32 is executed by the user equipment in active state to retrieve the information on MBMS service utilization that was stored in the memory of FIG. 1 while in idle state. The user equipment then inserts or embeds the retrieved information into an information element for the purposes of reporting MBMS service utilization to the network element 14 in a message carrying the IE, among others. In a step 36, the user equipment then sends the information element in the message that is sent to the network element. As mentioned before, the information element could be a special information element created for the purpose of such MBMS reporting and embedded in some kind of a message that the user equipment sends to the network element for some other purpose such as but not limited to an RRC connection request. After reporting the information element, the user equipment will then empty the MBMS status record to some value that signifies the fact that it is empty. A return is then made in the step 40. It should be mentioned that if it is determined in the step 30 that the UE has not used MBMS services while in idle state, the return 40 is made directly and the steps 32, 34, 36 and 38 are skipped and no report need be made.

Figure 4:
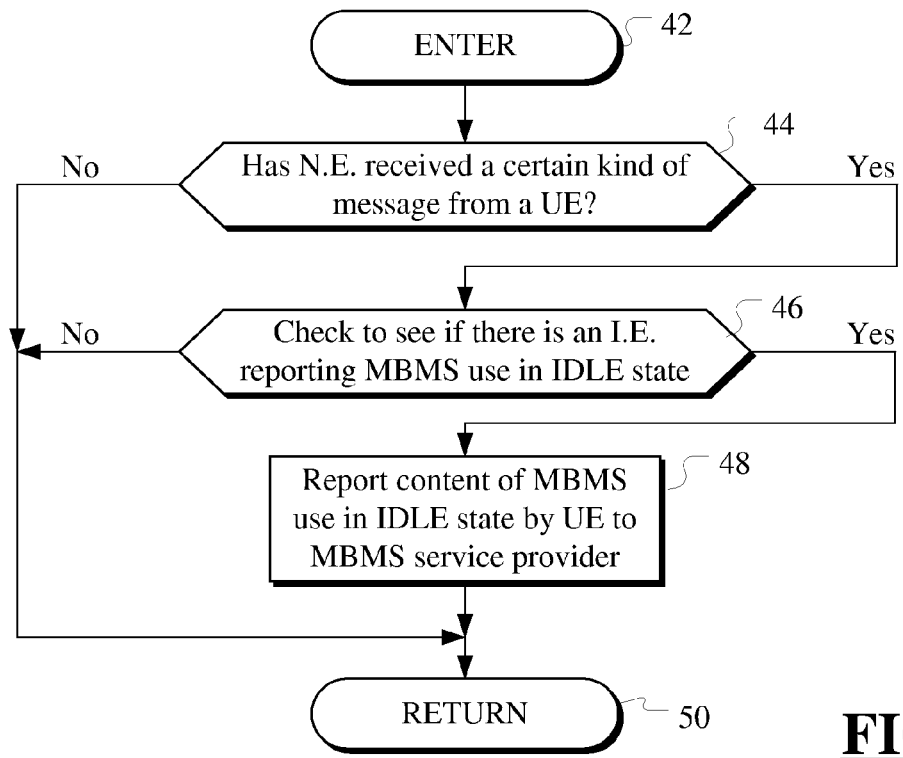
FIG. 4 is a flowchart showing a process carried out in a network element according to the invention.

FIG. 4 illustrates in a simplified flowchart steps that may be carried out in the network element 14 of FIG. 1, according to the present invention. First, a decision step 44 is shown in which the network element determines if it has received a certain kind of message from the user equipment such as the above-mentioned RRC Connection Request message. If so, a decision step 46 determines if the user equipment has used a multimedia broadcast and multicast service in an idle state by checking the information element mentioned above that a UE will send in that event. A protocol for carrying out such communication can be standardized for general usage in the art so that user equipment from one vendor can communicate effectively with network elements made by other vendors. The network element 14 then carries out a step 48 to utilize the information concerning whether the user equipment has used the multimedia broadcast and multicast service in the idle state for example for audience monitoring (which may be proprietary). In the network element 14, this utilization takes the form of reporting the content of MBMS usage in idle state by the UE to an MBMS service provider such as the MBMS service provider 16 of FIG. 1 over a connection signaling line 49. A return is then made in a step 50.

Figure 5:
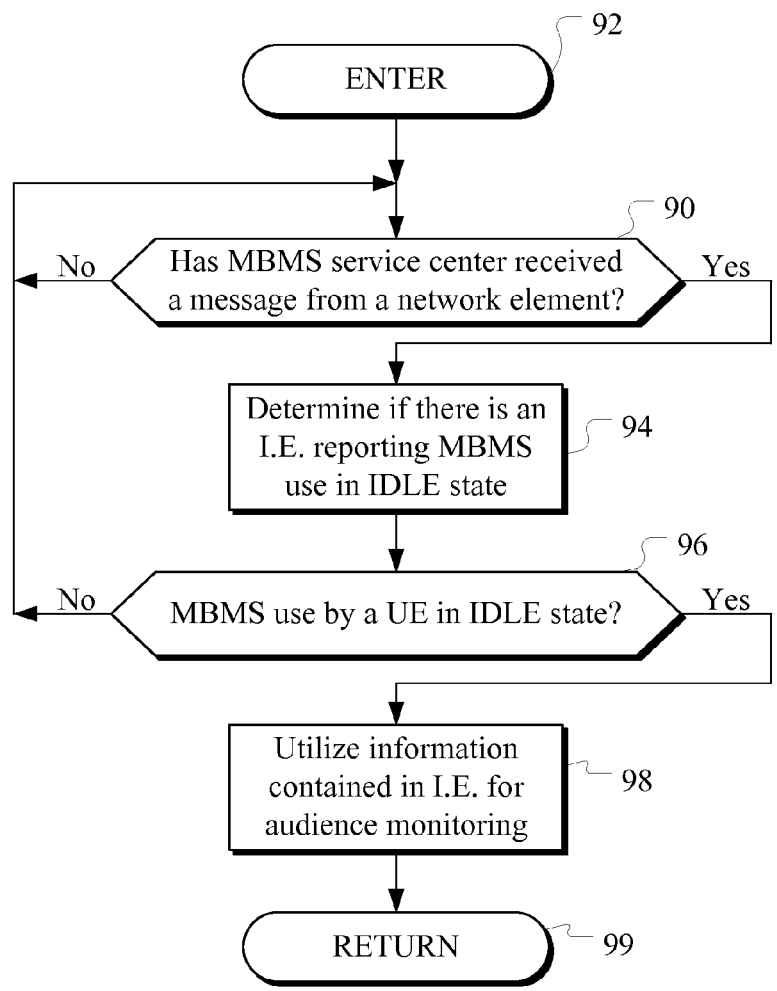
FIG. 5 is a flowchart showing a process carried out in a service provider according to the invention.

FIG. 5 illustrates a process carried out in a service provider such as the service provider shows a decision step 90 carried out after entering in a step 92 in order to determine if a message has been received from a network element such as the network element 14 of FIG. 1. If not, the step is repeated. If so, a step 94 is executed to determine if there is an information element in the message reporting MBMS use in idle state. If not, a decision step 96 forces a repeat of step 90. If so, the step 96 determines that user equipment has used a multimedia broadcast and multicast service in an idle state, and a step 98 is then executed to utilize the information concerning said user equipment's use of the multimedia broadcast and multicast service in the idle state for purposes of audience monitoring. After utilization a return may be made in a step 99.

It should be pointed out that in all four of the flowcharts of FIGS. 2, 3, 4, and 5, a step of determining if the user equipment has used an MBMS service in the idle state and a step of utilizing information concerning same is carried out for audience monitoring purposes.

Figure 6:
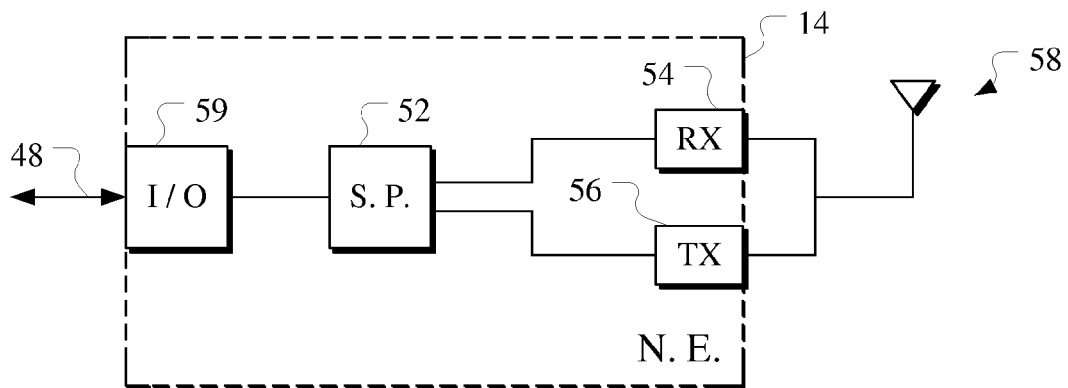
FIG. 6 shows a network element according to the invention.

FIG. 6 shows an example of the network element 14 in more detail. It includes a signal processor 52 connected to a receiver 54 and a transmitter 56 which are both connected to an antenna 58 also shown in FIG. 1. The signal processor is also connected to an input/output port 59 with which it communicates over the signal on the line 49 with the service provider 16.

Figure 9:
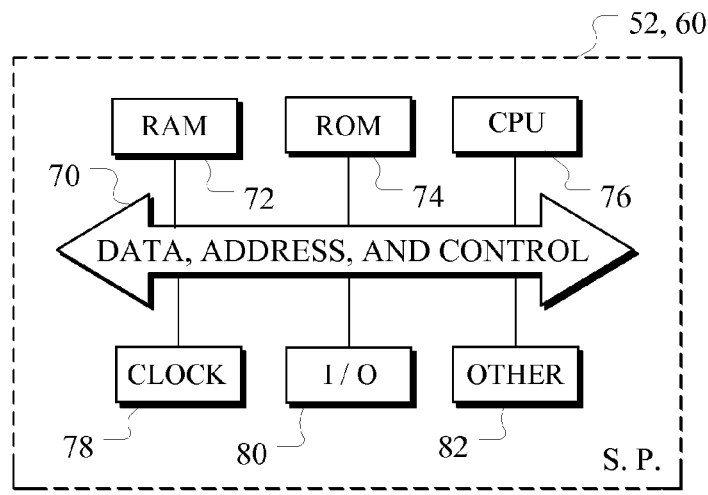
FIG. 9 shows a signal processor utilized in FIGS. 6-8.

The signal processor 52 is shown in more detail in FIG. 9 and may include a data, address and control bus 70 interconnecting a random access memory 72, a read only memory 74, a central processing unit 76, a clock 78, an input/output device 80, and other miscellaneous devices 82. The read only memory 74 may include program code written in a selected program language which may be executed by the central processing unit 76. Thus, the read only memory 74 in that case comprises a computer readable medium storing computer code for carrying out the steps of FIG. 6. It may also include code for carrying out additional steps (not shown) for exchanging information with the service provider 16. It should be understood that the signal processor of FIG. 9 may take other forms such as a specialized integrated unit to carry out the same functions in hardware instead of software running on a CPU. It could take the form of a combination of hardware and software as well.

Figure 7:
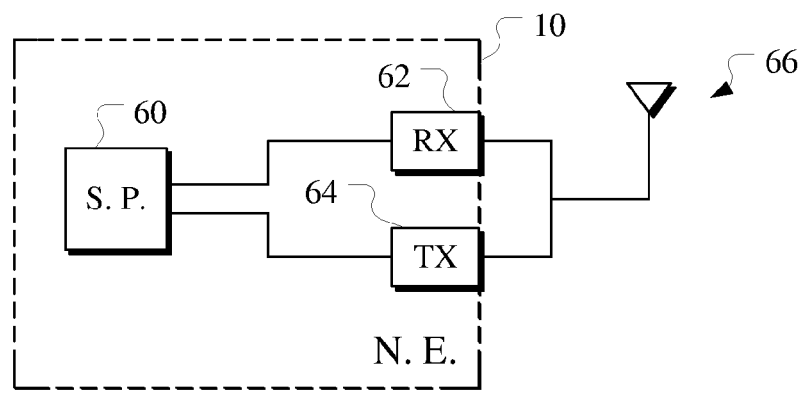
FIG. 7 shows user equipment according to the invention.

FIG. 7 shows an example of user equipment 10 of FIG. 1 in more detail. It also includes a signal processor 60 similar to the signal processor 52 in the network element 14. It also may take the form shown in FIG. 9 as explained previously. In that case, the read only memory 74 includes program code written in a programming language for carrying out the steps of FIGS. 2 and 3 in the user equipment 10. The user equipment 10 is shown having a receiver 62 and a transmitter 64 connected to the signal processor 60 and to an antenna 66 also shown in FIG. 1.

Figure 8:
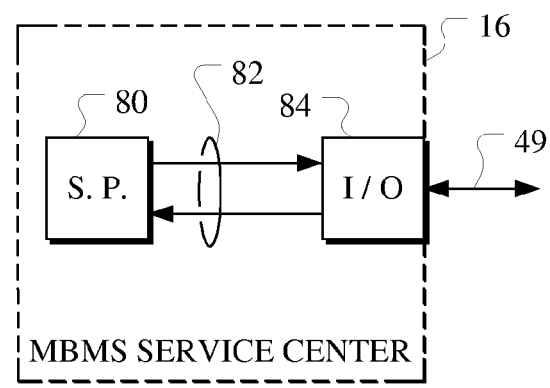
FIG. 8 shows an MBMS provider according to the invention.

FIG. 8 shows a service provider 16 in more detail. It includes a signal processor 80 connected by bidirectional signaling lines 82 to an input/output device 84 with which the service provider communicates over the line 49 with the network element 14. The signal processor may take the form shown in FIG. 9 as well so that the ROM contains program code for carrying out the steps of FIG. 5.

LTE, or Long Term Evolution (also known as 3.9G), refers to research and development involving the Third Generation Partnership Project (3GPP) aimed at identifying technologies and capabilities that can improve systems such as the UMTS. Information about LTE can be found in 3GPP TR 25.913, *Requirements for Evolved UTRA (E-UTRA) and Evolved UTRAN* and also in 3GPP TR 25.813, *Evolved UTRA and UTRAN—Radio interface protocol aspects*. This invention arose in the context of developments underway in the LTE but is not necessarily limited to that context.

Figure 10:
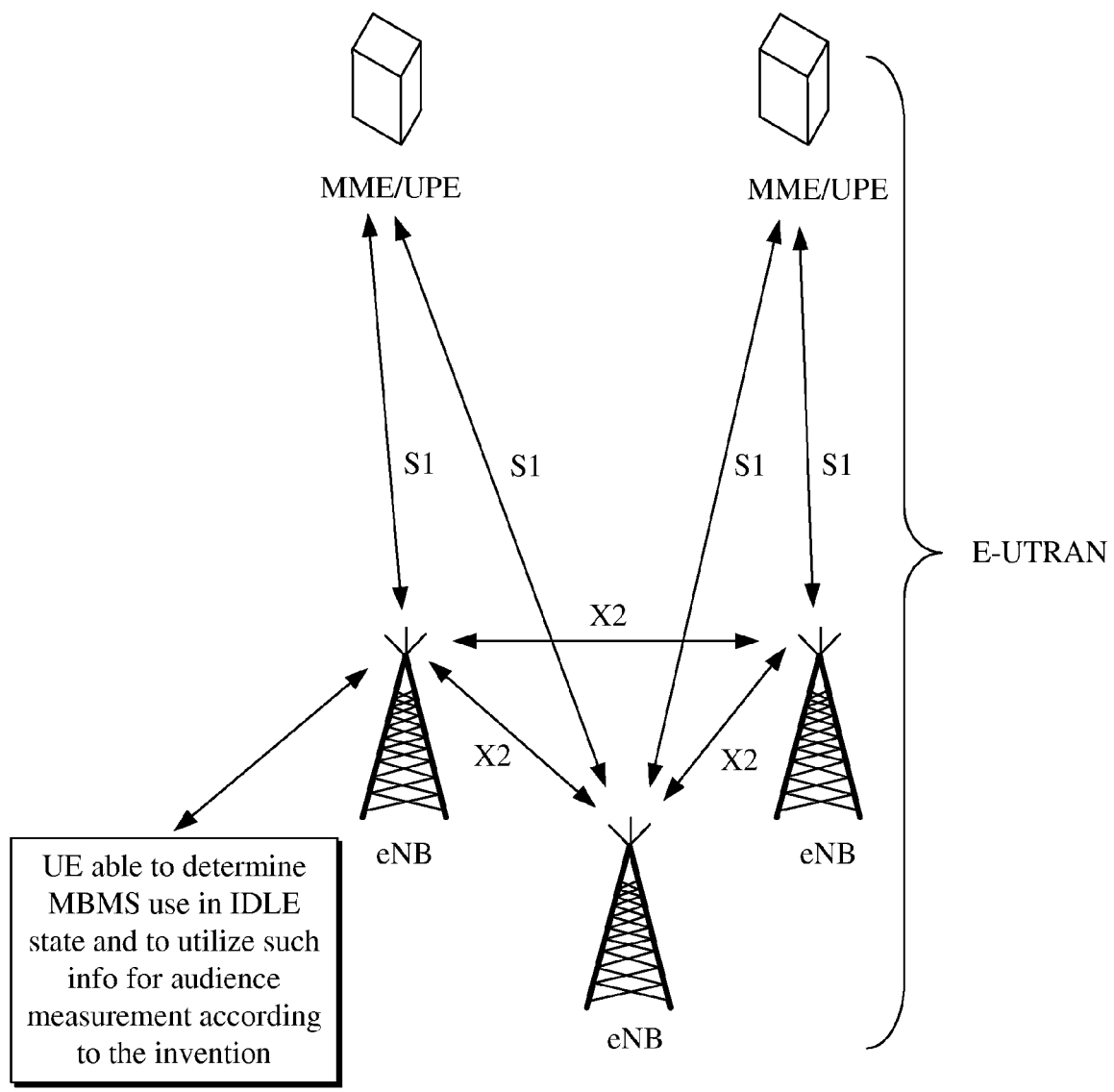
FIG. 10 shows an LTE architecture with elements modified to include features of the present invention.

An example of the E-UTRAN architecture is illustrated in FIG. 10. It comprises eNBs, providing E-UTRA user plane (RLC/MAC/PHY) and control plane (RRC) protocol terminations towards the UE. The eNBs are interconnected with each other by means of an X2 interface. The eNBs are also connected by means of an S1 interface to an EPC (evolved packet core) more specifically to an MME (mobility management entity) and a UPE (user plane entity). The S1 interface supports a many-to-many relation between MMEs/UPEs and eNBs. The S1 interface supports a functional split between the MME and the UPE. The MMU/UPE in the example of FIG. 10 is one option for the access gateway (aGW).

The eNB may host functions such as radio resource management (radio bearer control, radio admission control, connection mobility control, dynamic allocation of resources to UEs in both uplink and downlink), selection of a mobility management entity (MME) at UE attachment, routing of user plane data towards the user plane entity (UPE), scheduling and transmission of paging messages (originated from the MME), scheduling and transmission of broadcast information (originated from the MME or O&M), and measurement and measurement reporting configuration for mobility and scheduling. The MME/UPE may host functions such as the following: distribution of paging messages to the eNBs, security control, IP header compression and encryption of user data streams; termination of U-plane packets for paging reasons; switching of U-plane for support of UE mobility, idle state mobility control, SAE bearer control, and ciphering and integrity protection of NAS signaling.

The network element 14 of FIGS. 1 and 6 may comprise any one or more of the elements shown in FIG. 10.

Although the invention is related to LTE, the solution of the present invention may also be applicable to present and future systems other than LTE.

The invention claimed is:

1. A method, comprising:
   determining if user equipment has used a multimedia broadcast and multicast service in an idle state, and
   utilizing information concerning whether said user equipment has used said multimedia broadcast and multicast service in said idle state for audience monitoring, wherein said determining is carried out in said idle state in said user equipment and said utilizing comprises said user equipment storing information in a memory of said user equipment concerning multimedia broadcast and multicast service utilization while in said idle state, said method further comprising said user equipment
   sending said stored information to a network element in a user equipment originated message sent when the user equipment transitions from said idle state to an active state for a purpose primarily other than audience monitoring.

2. The method of claim 1, wherein said user equipment transitions from said idle state to said active state following an indeterminate time break after the user equipment stops using the multimedia broadcast and multimedia service in said idle state.

3. The method of claim 1, wherein said determining is carried out in said user equipment in said active state and wherein said utilizing comprises retrieving said information on multimedia broadcast and multicast service in said idle state, and sending an information element containing said retrieved information in said user equipment originated message sent to said network element.

4. The method of claim 3, further comprising emptying a record of said information on multimedia and multicast service utilization from a record in a memory of said user equipment.

5. A method, comprising:
   determining if user equipment has used a multimedia broadcast and multicast service in an idle state, and
   utilizing information concerning whether said user equipment has used said multimedia broadcast and multicast service in said idle state for audience monitoring, wherein said determining is carried out in a network element and said utilizing comprises said network element reporting multimedia broadcast and multicast service usage information by a user equipment in idle state to a multimedia broadcast and multicast service control entity, wherein said information is received by said network element in a user equipment originated message sent to said network element by said user equipment when the user equipment transitions from said idle state to an active state for a purpose primarily other than audience monitoring.

6. The method of claim 5, wherein said user equipment originated message includes an information element for reporting multimedia broadcast and multicast service usage.

7. The method of claim 5, wherein said user equipment transitions from said idle state to said active state following an indeterminate time break after the user equipment stops using the multimedia broadcast and multimedia service in said idle state.

8. An apparatus, comprising
   at least one processor
   and at least one memory including computer program code
   the at least one memory and the computer program code configured to, with the at least one processor, cause the apparatus at least to
   determine if user equipment has used a multimedia broadcast and multicast service in an idle state, and
   utilize information concerning whether said user equipment has used said multimedia broadcast and multicast service in said idle state for audience monitoring, wherein said determining is carried out in said idle state in said user equipment and said utilizing comprises storing information in a memory of said user equipment concerning multimedia broadcast and multicast service utilization while in said idle state, and
   send said stored information to a network element in a user equipment originated message sent when the user equipment transitions from said idle state to an active state for a purpose primarily other than audience monitoring.

9. The apparatus of claim 8, wherein said user equipment transitions from said idle state to said active state following an indeterminate time break after the user equipment stops using the multimedia broadcast and multimedia service in said idle state.

10. The apparatus of claim 8, wherein said determining is carried out in said user equipment in said active state and wherein said utilizing comprises retrieving said information on multimedia broadcast and multicast service in said idle state, and sending an information element containing said retrieved information in said user equipment originated message sent to said network element.

11. The apparatus of claim 10, wherein the at least one memory and the computer program code are further configured to, with the at least one processor, cause the apparatus to empty a record of said information on multimedia and multicast service utilization from a record in a memory of said user equipment.

12. An apparatus, comprising
at least one processor
and at least one memory including computer program code
the at least one memory and the computer program code configured to, with the at least one processor, cause the apparatus at least to
determine if user equipment has used a multimedia broadcast and multicast service in an idle state, and
utilize information concerning whether said user equipment has used said multimedia broadcast and multicast service in said idle state for audience monitoring, wherein said determining is carried out in a network element and said utilizing comprises said network element reporting multimedia broadcast and multicast service information usage by a user equipment in idle state to a multimedia broadcast and multicast service control entity, wherein said information is received by said network element in a user equipment originated message sent to said network element by said user equipment when said user equipment transitions from said idle state to an active state for a purpose primarily other than audience monitoring.

13. The apparatus of claim 8, wherein said user equipment originated message includes an information element for reporting multimedia broadcast and multicast service usage.

14. An apparatus comprising:
means for determining if user equipment has used a multimedia broadcast and multicast service in an idle state,
means for utilizing information concerning whether said user equipment has used said multimedia broadcast and multicast service in said idle state for audience monitoring wherein said determining is carried out in said idle state in said user equipment and said utilizing comprises storing information in a memory of said user equipment concerning multimedia broadcast and multicast service utilization while in said idle state, and
means for sending said stored information to a network element in a user equipment originated message sent when the user equipment transitions from said idle state to an active state for a purpose primarily other than audience monitoring.

15. The apparatus of claim 14, wherein said user equipment transitions from said idle state to said active state following an indeterminate time break after the user equipment stops using the multimedia broadcast and multimedia service in said idle state.

16. A non-transitory readable medium having program code stored thereon for execution by a processor to cause the user equipment to perform:
determining if said user equipment has used a multimedia broadcast and multicast service in an idle state, and
utilizing information concerning whether said user equipment has used said multimedia broadcast and multicast service in said idle state for audience monitoring, wherein said determining is carried out in said idle state in said user equipment and said utilizing comprises storing information in a memory of said user equipment concerning multimedia broadcast and multicast service utilization while in said idle state, and
sending said stored information to a network element in a user equipment originated message sent when the user equipment transitions from said idle state to an active state for a purpose primarily other than audience monitoring.

17. The non-transitory computer readable medium of claim 16, wherein said user equipment transitions from said idle state to said active state following an indeterminate time break after the user equipment stops using the multimedia broadcast and multimedia service in said idle state.

18. The non-transitory computer readable medium of claim 16, wherein said determining is carried out in said user equipment in an active state and wherein said utilizing comprises retrieving said information on multimedia broadcast and multicast service in said idle state, and sending an information element containing said retrieved information in said user equipment originated message sent to said network element.

19. The non-transitory computer readable medium of claim 18, wherein execution of said program code by said processor further causes the user equipment to perform emptying a record of said information on multimedia and multicast service utilization from a record in a memory of said user equipment.

20. A non-transitory readable medium having program code stored thereon for execution by a processor to cause network element to perform:
determining if user equipment has used a multimedia broadcast and multicast service in an idle state, and
utilizing information concerning whether said user equipment has used said multimedia broadcast and multicast service in said idle state for audience monitoring, wherein said utilizing comprises reporting multimedia broadcast and multicast service usage by a user equipment in idle state to a multimedia broadcast and multicast service control entity, wherein said information is received in a user equipment originated message sent to said network element by said user equipment when said user equipment transitions from said idle state to an active state for a purpose primarily other than audience monitoring.

21. The non-transitory computer readable medium of claim 16, wherein said user equipment originated message includes an information element for reporting multimedia broadcast and multicast service usage.

22. The non-transitory computer readable medium of claim 20, wherein said user equipment transitions from said idle state to said active state following an indeterminate time break after the user equipment stops using the multimedia broadcast and multimedia service in said idle state.

23. A system, comprising
at least one processor
and at least one memory including computer program code
the at least one memory and the computer program code configured to, with the at least one processor, cause the system at least to determine if user equipment has used a multimedia broadcast and multicast service in an idle state, and to utilize information concerning whether said user equipment has used said multimedia broadcast and multicast service in said idle state for audience monitoring, wherein said information is made available by said user equipment in a user equipment originated message initiated when said user equipment transitions from said idle state to an active state for a purpose primarily other than audience monitoring.

24. The system of claim 23, wherein said user equipment transitions from said idle state to said active state following an indeterminate time break after the user equipment stops using the multimedia broadcast and multimedia service in said idle state.

\* \* \* \* \*